(12) United States Patent
Tanaka et al.

(10) Patent No.: US 8,013,049 B2
(45) Date of Patent: Sep. 6, 2011

(54) METHOD FOR PRODUCING CORE-SHELL TYPE HIGHLY LIQUID ABSORBENT RESIN PARTICLES

(75) Inventors: Hisakazu Tanaka, Osaka (JP); Kazuo Yamamura, Osaka (JP); Yoshiki Hasegawa, Nishinomiya (JP); Masayuki Kamei, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 623 days.

(21) Appl. No.: 10/576,362

(22) PCT Filed: Jan. 21, 2005

(86) PCT No.: PCT/JP2005/000750
§ 371 (c)(1),
(2), (4) Date: Feb. 12, 2007

(87) PCT Pub. No.: WO2005/073263
PCT Pub. Date: Aug. 11, 2005

(65) Prior Publication Data
US 2007/0276061 A1 Nov. 29, 2007

(30) Foreign Application Priority Data
Jan. 28, 2004 (JP) ................. 2004-019757

(51) Int. Cl.
*C08F 2/16* (2006.01)
*C08F 279/02* (2006.01)
*C08K 3/20* (2006.01)
*C08L 83/00* (2006.01)

(52) U.S. Cl. ........ 524/460; 523/201; 524/457; 524/458; 525/243

(58) Field of Classification Search .................. 525/242
See application file for complete search history.

(56) References Cited

U.S. PATENT DOCUMENTS

| | | | | |
|---|---|---|---|---|
| 3,691,108 | A * | 9/1972 | Ichiki et al. | 510/536 |
| 5,453,458 | A * | 9/1995 | Takeuchi et al. | 523/201 |
| 5,744,564 | A | 4/1998 | Stanley, Jr. et al. | |
| 7,317,056 | B2 * | 1/2008 | Yoshimura et al. | 526/78 |
| 2003/0153887 | A1 * | 8/2003 | Nawata et al. | 604/372 |
| 2007/0178786 | A1 * | 8/2007 | Nawata et al. | 442/118 |

FOREIGN PATENT DOCUMENTS

| | | |
|---|---|---|
| JP | 6-506252 | 7/1994 |
| JP | 2001-31704 | 2/2001 |
| JP | 2001-220415 | 8/2001 |
| JP | 2003-33652 | 2/2003 |
| JP | 2003-206324 | 7/2003 |
| JP | 2003201306 A * | 7/2003 |
| JP | 2003-245544 | 9/2003 |
| JP | 2005-47977 | 2/2005 |
| WO | WO 93/19099 A1 | 9/1993 |

* cited by examiner

*Primary Examiner* — David Wu
*Assistant Examiner* — Elizabeth Eng
(74) *Attorney, Agent, or Firm* — Edwards Angell Palmer & Dodge LLP; James E. Armstrong, IV; Nicholas J. DiCeglie, Jr.

(57) ABSTRACT

The present invention discloses a production method of core-shell type highly liquid absorbent resin particles comprising:
(1) a first step in which a particle core portion is formed by suspension polymerizing an aqueous solution (e) containing (meth)acrylic acid, a crosslinking agent (c) and an anionic surfactant (d) in a hydrophobic organic solvent (a) containing a nonionic surfactant (b), and
(2) a second step in which a shell portion that covers the particle core portion is formed by suspension polymerizing an aqueous solution (g) containing a water-soluble vinyl polymer (f), having carboxyl groups and polymerizable unsaturated double bonds and having a number average molecular weight of 500 to 10000, in a suspension obtained in the first step.

12 Claims, 2 Drawing Sheets

US 8,013,049 B2

METHOD FOR PRODUCING CORE-SHELL TYPE HIGHLY LIQUID ABSORBENT RESIN PARTICLES

TECHNICAL FIELD

The present invention relates to a production method for highly liquid absorbent resin particles by water-in-oil type reverse phase suspension polymerization that is useful in the fields of medicine, hygiene, and various other fields.

BACKGROUND ART

Liquid absorbent resins are able to absorb water, blood and the like equal to several times their mass, and are used in sanitary articles, diapers and the like in the fields of medicine and hygiene, as well as in water sealing agents in the field of construction.

In particular, liquid absorbent resins used in sanitary articles and diapers are required to be high added value products that are able to adequately absorb blood and urine and prevent soiling of clothing and the like due to leakage. In order to prevent leakage of blood and the like in sanitary articles, it is important to not only improve the liquid absorbency of the liquid absorbent resin, but also to maintain the liquid absorbent resin in a uniformly distributed state inside absorber such as the sanitary article, and various studies have been conducted for improving these. Here, an absorbent refers to a site that composes a portion of a sanitary article or diaper and is capable of absorbing blood and urine, and an example thereof is that a mixture of flocculent fibrous pulp and particulate liquid absorbent resin is enveloped in a nonwoven fabric.

In recent years, in order to facilitate ease of production, studies have been conducted on ways to produce liquid absorbent resins by so-called water droplet-in-oil type, reverse phase suspension polymerization in which an aqueous solution containing a radical polymerizable compound and polymerization initiator is dropped into an organic solvent, the aqueous solution is dispersed in the organic solvent by stirring, and the radical polymerizable compound is polymerized in the resulting water droplets. However, since the liquid absorbent resin obtained according to the aforementioned production method is normally in the form of particles having a smooth surface, it is difficult to load them into flocculent fibrous pulp inside an absorbent, resulting in causing uneven distribution of the particles. As a result, such an absorbent is unable to adequately absorb blood and the like and tends to cause the occurrence of leakage. In addition, since a liquid absorbent resin obtained according to the aforementioned production method requires dust control measures and the like since the diameter of the resulting particles is extremely small, there are also problems with ease of handling.

As a way of resolving this problem, it has been reported that a highly absorbent resin is able to be produced that has a high degree of resin immobilization, that is, makes it difficult for the resin to become unevenly distributed within the absorbent, by suspension polymerization in which an aqueous solution containing a specific phosphate ester-based dispersant and a water-soluble vinyl monomer is gradually supplied into a hydrophobic organic solvent containing a nonionic surfactant (refer to, for example, Patent Document 1).

However, since the aforementioned highly absorbent resin did not have adequate affinity for blood and urine, it was not adequate for use as a sanitary article and the like in terms of liquid absorbency, and particularly blood absorbency. In addition, the aforementioned highly absorbent resin also had the problem of a significant decrease in liquid absorbency in the case of being made to repeatedly absorb blood and the like.

Moreover, an absorbent resin that is obtained by supplying an aqueous solution containing a specific phosphate ester-based surfactant, a specific polyacidic amino acid, an ethylenic unsaturated compound and a crosslinking agent into an inert solvent containing a specific phosphate ester-based surfactant to conduct suspension polymerization, and performing surface crosslinking treatment on polymer particles obtained by the suspension polymerization, has been reported to have extraordinarily superior absorbency characteristics with respect to blood (refer to, for example, Patent Document 2).

However, although an absorbent resin obtained by using polyaspartic acid for the aforementioned specific polyacidic amino acid has superior blood absorbency, it has the problem of having a brown color.

Products in the fields of medicine and hygiene, such as sanitary articles and diapers, in which liquid absorbent resins are used, are especially required to be clean and sanitary, and the presenting of a brown color by the aforementioned liquid absorbent resin can be said to be a serious problem since it causes the loss of a sense of cleanliness and gives an unsanitary impression, thereby significantly reducing the value of industrial use in said fields.

[Patent Document 1]
Japanese Unexamined Patent Application, First Publication No. 2001-31704
[Patent Document 2]
Japanese Unexamined Patent Application, First Publication No. 2003-206324

DISCLOSURE OF THE INVENTION

Problem to be Solved by the Invention

As a result of previous research and development, the liquid absorbency of liquid absorbent resins has been improved considerably as previously described. However, despite the growing needs for a highly liquid absorbent resin that maintains a high level of liquid absorbency, and particularly blood absorbency, and has a color that gives a sense of cleanliness, and preferably a white color, so as to be able to be applied in the fields of medicine and hygiene, a highly liquid absorbent resin that satisfies requirements like those previously described has not yet been developed.

The object of the present invention is to provide a production method of core-shell type highly liquid absorbent resin particles that have superior liquid absorbency, and particularly blood absorbency, are able to maintain superior blood absorbency even after having repeatedly absorbed blood, and has a color that imparts a sense of cleanliness.

Means for Solving the Problem

In order to achieve the aforementioned object, the inventors of the present invention proceeded with research with the aim of improving color tone and improving the level of blood absorbency, and particularly repeated blood absorbency, by focusing on the superior blood absorbency of resin particles obtained by the aforementioned suspension polymerization of the prior art.

First, acrylic polymer particles, having a shape affording superior handling as a liquid absorbent resin and having a suitable particle diameter of several hundred micrometers, were obtained by suspension polymerizing an aqueous solution containing (meth)acrylic acid, a crosslinking agent and an anionic surfactant in a hydrophobic organic solvent, wherein said hydrophobic organic solvent is maintained at the polymerization reaction temperature, and a nonionic surfactant is contained. However, although said acrylic polymer particles demonstrated a certain degree of blood absorbency, in the case of repeatedly absorbing blood, the blood absorbency ended up decreasing, thereby resulting in insufficient repeated blood absorbency.

Therefore, as a result of conducting further research, core-shell type highly liquid absorbent resin particles were obtained by suspension polymerizing an aqueous solution containing the aforementioned (meth)acrylic acid in the aforementioned hydrophobic organic solvent, and after allowing said polymerization reaction to proceed to a certain extent, suspension polymerizing an aqueous solution containing a water-soluble vinyl polymer having carboxyl groups and polymerizable unsaturated double bonds and a number average molecular weight within a specific range. These core-shell type highly liquid absorbent resin particles had a white color that gives a sense of cleanliness, and their blood absorbency and repeated blood absorbency were confirmed to be extremely satisfactory, thereby leading to completion of the present invention.

That is, the present invention provides a production method of core-shell type highly liquid absorbent resin particles comprising:

(1) a first step in which a particle core portion is formed by suspension polymerizing an aqueous solution (e) containing (meth)acrylic acid, a crosslinking agent (c) and an anionic surfactant (d) in a hydrophobic organic solvent (a) containing a nonionic surfactant (b), and (2) a second step in which a shell portion that is coated onto the particle core portion is formed by suspension polymerizing an aqueous solution (g) containing a water-soluble vinyl polymer (f), having carboxyl groups and polymerizable unsaturated double bonds and having a number average molecular weight of 500 to 10000, in a suspension obtained in the first step.

Effects of the Invention

According to the present invention, a method is provided for producing core-shell type highly liquid absorbent resin particles that have superior liquid absorbency, and particularly blood absorbency, are able to maintain superior blood absorbency without undergoing a decrease in blood absorbency even after repeatedly absorbing blood, and have a white color that gives a sense of cleanliness.

Core-shell type highly liquid absorbent resin particles obtained according to the production method of the present invention are optimal for use in medical and hygiene applications such as sanitary napkins, tampons, medical blood absorbent sheets, drip absorbers, wound protective materials, wound healing materials and surgical waste liquid treatment agents. In addition, since the aforementioned highly liquid absorbent resin also has superior liquid absorbency for liquids other than blood such as urine, seawater, cement water, soil water, fertilizer-containing water, rainwater and wastewater, it is also useful in civil engineering and construction applications such as water-swelling rubber and water stopping agents.

BEST MODE FOR CARRYING OUT THE INVENTION

Figure 1:
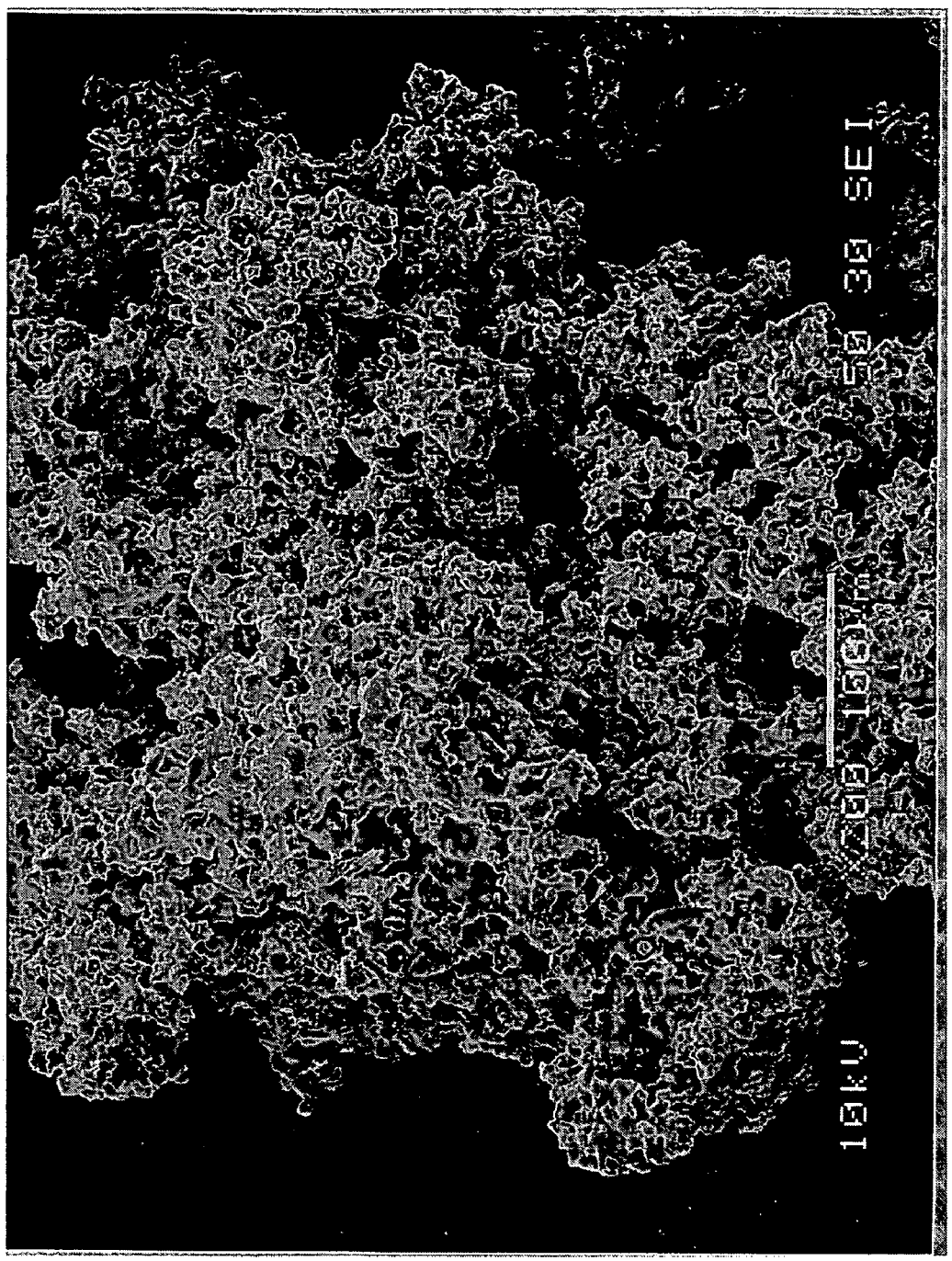
FIG. 1 is a photograph of highly liquid absorbent resin particles (A) obtained in Example 1 taken at a magnification factor of 200 using a scanning electron microscope.

The present invention relates to a method for producing core-shell type highly liquid absorbent resin particles by supplying aqueous solutions containing radical polymerizable compounds and suspension polymerizing these aqueous solutions in a hydrophobic organic solvent.

The aforementioned suspension polymerization is carried out in two steps. That is, a method is employed in which aqueous solutions containing two types of radical polymerizing compounds and the like are prepared in advance, each aqueous solution is separately supplied into a hydrophobic organic solvent, and suspension polymerization is carried out in two steps.

In the first step, an aqueous solution (e) containing (meth)acrylic acid, a crosslinking agent (c) and an anionic surfactant (d) is supplied to a hydrophobic organic solvent (a) containing a nonionic surfactant (b) maintained at a polymerization reaction temperature followed by suspension polymerization to form a particle core portion.

In the second step, an aqueous solution (g) containing a water-soluble vinyl polymer (f), having carboxyl groups and polymerizable unsaturated double bonds, and having a number average molecular weight of 500 to 10000, is supplied into the aforementioned suspension obtained in the first step followed by suspension polymerization to form a shell portion that covers the aforementioned particle core portion.

A method in which aqueous solution (e) is supplied gradually and not all at once, that is, one in which a suitable amount is supplied intermittently or continuously over a certain amount of time, is preferable for the method used to supply aqueous solution (e) in the aforementioned first step. As a result of supplying aqueous solution (e) gradually, a radical polymerization reaction can proceed in a state in which aqueous solution (e) is dispersed in the form of fine water droplets in hydrophobic organic solvent (a), thereby allowing the obtaining of powdery acrylic polymer particles having a desired diameter as described later. The amount of aqueous solution (e) gradually supplied, the amount of time, and other conditions should be suitably set according to conditions such as the stirred state of hydrophobic organic solvent (a) and the reaction scale so that a state is maintained in which aqueous solution (e) is dispersed in the form of fine water droplets in hydrophobic organic solvent (a).

It is necessary that hydrophobic organic solvent (a) be maintained within the required temperature range for the polymerization reactions of the radical polymerizable compounds contained in the supplied aqueous solution (e) and aqueous solution (g) to proceed. Although this temperature range varies according to the type of polymerization initiators that can be used during the aforementioned radical polymerization reactions and the like, it is preferably within the range of 40 to 150° C. and more preferably within the range of 60 to 90° C.

The aforementioned aqueous solution (e) supplied in the aforementioned first step disperses in the form of fine water droplets in hydrophobic organic solvent (a), and the radical polymerizable compounds such as (meth)acrylic acid and crosslinking agent (c) contained in these water droplets immediately undergo a radical polymerization reaction. That is, the polymerization reaction proceeds and acrylic polymer particles are formed even while aqueous solution (e) is being gradually supplied.

Aqueous solution (g) supplied in the aforementioned second step is supplied during the time until the entire polymerization reaction of (meth)acrylic acid and crosslinking agent (c) contained in aqueous solution (e) has completely finished after the aforementioned aqueous solution (e) has finished being supplied, that is, roughly from immediately after to within 2 hours after aqueous solution (e) has finished being supplied. As a result, resin particles can be formed in which the acrylic polymer particles formed in the aforementioned first step and the aforementioned water-soluble vinyl polymer (f) are chemically bonded, and the ultimately obtained core-shell type highly liquid absorbent resin particles have superior blood absorbency and are resistant to a decrease in blood absorbency even when made to repeatedly absorb blood.

Aqueous solution (g) may be supplied all at once or gradually.

As previously described, the radical polymerizable compound contained in the aforementioned aqueous solution (e), which is supplied to hydrophobic organic solvent (a) maintained within a temperature range required for the polymerization reaction to proceed in the first step, immediately undergoes a polymerization reaction. Accordingly, the majority of said radical polymerizable compound is believed to have finished undergoing the polymerization reaction at the time aqueous solution (g) is supplied in the second step. In other words, the particle core portion is already formed. Thus, nearly all of water-soluble vinyl polymer (f) supplied in the second step forms a shell portion that envelops the said formed particle core portion, and the resulting highly liquid absorbent resin particles have a so-called core-shell structure.

In the present invention, a nonionic surfactant (b) is contained in hydrophobic organic solvent (a), and an anionic surfactant (d) is used in aqueous solution (e). This method of using two types of surfactants is also important in terms of obtaining the effects of the present invention.

That is, although suspension polymerization is carried out in the state in which aqueous solution (e) is dispersed in the form of fine water droplets in hydrophobic organic solvent (a) in the present invention, the polymer particles formed during the course of the polymerization reaction aggregate to a certain extent. The effects of the present invention are not adequately demonstrated if the degree of this aggregation is too small, while excessive aggregation must naturally be avoided.

As a result of employing the aforementioned method of using two types of surfactants, although the specific reasons are unclear, the degree of aggregation of the polymer particles is controlled to a suitable state, and the surfaces of the polymer particles have considerable surface irregularities. As a result, core-shell type highly liquid absorbent resin particles can be obtained that have particularly superior blood absorbency and are resistant to decreases in blood absorbency even if made to repeatedly absorb blood.

In order to allow the water droplet-in-oil type reverse phase suspension polymerization reactions of the present invention to proceed satisfactorily, it is important that hydrophobic organic solvent (a) be stirred sufficiently when supplying aqueous solution (e) and aqueous solution (g). The stirring conditions vary according to the type of stirrer used, size of the reaction vessel and the like. In the case of assuming stirring in a 1 cubic meter reaction vessel having a baffle and equipped with a typical anchor stirrer, for example, the rotating speed of the stirrer is preferably within the range of 40 to 100 rpm and more preferably within the range of 50 to 90 rpm.

By stirring for 10 minutes to 3 hours at 60 to 80° C., for example, after supplying aqueous solution (g) to hydrophobic organic solvent (a) in the aforementioned second step, a slurry-like mixture can be obtained that contains swollen highly liquid absorbent resin particles. The resulting highly liquid absorbent resin particles can be separated from the aforementioned slurry-like mixture by azeotropic dehydration or heat drying and the like.

The aforementioned azeotropic dehydration is conducted by heating the aforementioned slurry-like mixture for a fixed amount of time at the azeotropic temperature of water and hydrophobic organic solvent (a). After dehydrating 75% to 95% of the water contained in the aforementioned slurry-like mixture by azeotropic dehydration, the highly liquid absorbent resin particles and hydrophobic organic solvent (a) are separated by decantation, filtration or the like followed by drying to obtain powdery core-shell type highly liquid absorbent resin particles.

The aforementioned heat drying is used to obtain powdery core-shell type highly liquid absorbent resin particles by evaporating water and hydrophobic organic solvent (a) using a vacuum dryer, hot air dryer, air flow dryer, fluid bed dryer, drum dryer or the like. The drying temperature is preferably 50° C. or higher, more preferably within the range of 60 to 200° C. and even more preferably within the range of 70 to 180° C. Drying within this temperature range makes it possible to prevent decreases in liquid absorbency caused by thermal decomposition of the highly liquid absorbent resin particles.

Core-shell type highly liquid absorbent resin particles obtained according to the production method of the present invention preferably have an average particle diameter within the range of 100 to 1000 μm, and more preferably within the range of 100 to 500 μm. Highly liquid absorbent resin particles having an average particle size within this range eliminate the need for anti-dust measures since they are less likely to become airborne in the production method.

The aforementioned average particle diameter is the value obtained as follows. That is, the highly liquid absorbent resin particles have graded with a plurality of sieves, and mass ratio of highly liquid absorbent resin particles remaining on each sieve (sieve residue) to the total amount of highly liquid absorbent resin particles used in grading is calculated. The particle size distribution is generated from the calculated value of the mass ratio and the size of the mesh openings of each corresponding sieve, and a size in which the integrated value of the sieve residue shows 50% by mass in a particle size distribution is provided as the average particle diameter.

Next, a detailed explanation is provided of each raw material used in the production method of core-shell type highly liquid absorbent resin particles of the present invention.

Examples of hydrophobic organic solvents that can be used for hydrophobic organic solvent (a) used in the present invention include aliphatic hydrocarbon solvents such as n-pentane, n-hexane, n-heptane and n-octane, alicyclic hydrocarbon solvents such as cyclohexane and methylcyclohexane, and aromatic hydrocarbon solvents such as benzene, toluene and xylene. Among them, n-hexane, n-heptane and cyclohexane are preferable.

The aforementioned hydrophobic organic solvent (a) is preferably used at 0.5 to 10 times, and more preferably at 0.8 to 3 times, the weight of the (meth)acrylic acid contained in aqueous solution (e). If the amount of hydrophobic organic solvent (a) used is within these ranges, excessive aggregation of the core-shell type highly liquid absorbent resin particles can be inhibited and liquid absorbency can be prevented from decreasing.

Next, an explanation is provided of nonionic surfactant (b) used in the present invention.

Examples of nonionic surfactants that can be used for the aforementioned nonionic surfactant (b) include polyoxyalkylene fatty acid esters such as polyoxyalkylene sorbitan fatty acid esters, polyoxyalkylene sorbitol fatty acid esters and polyoxyalkylene glycerin fatty acid esters as well as sorbitan fatty acid esters, sucrose fatty acid esters, glycerin fatty acid esters, polyoxyalkylene alkyl ethers, phosphate triesters and block copolymers of polyoxyethylene and polyoxypropylene, and these can be used alone or in a combination of two or more types.

Examples of the aforementioned polyoxyalkylene sorbitan fatty acid esters that can be used include polyoxyethylene sorbitan monostearate, polyoxyethylene sorbitan tristearate, polyoxyethylene sorbitan monooleate, and polyoxyethylene sorbitan trioleate.

Examples of the aforementioned sorbitan fatty acid esters that can be used include sorbitan monolaurate, sorbitan monostearate, sorbitan tristearate, sorbitan monooleate and sorbitan trioleate.

Examples of the aforementioned sucrose fatty acid esters that can be used include sucrose stearic acid ester, sucrose palmitic acid ester, sucrose oleic acid ester and sucrose lauric acid ester.

Examples of the aforementioned polyoxyalkylene sorbitol fatty acid esters that can be used include polyoxyethylene sorbitol tetraoleate.

Examples of the aforementioned polyoxyalkylene glycerin fatty acid esters that can be used include polyoxyethylene glycerin monostearate and polyoxyethylene glycerin monooleate.

Examples of the aforementioned glycerin fatty acid esters that can be used include glycerin monostearate, glycerin monooleate and glycerin monocaprylate.

Examples of the aforementioned polyoxyalkylene alkyl ethers that can be used include polyoxyethylene lauryl ether, polyoxyethylene cetyl ether and polyoxyethylene stearyl ether.

Examples of the aforementioned phosphate triesters that can be used include tripolyoxyethylene alkyl ether phosphates.

The structure and hydrophile-lipophile balance (HLB) of the aforementioned nonionic surfactant (b) has an effect on the particle shape of the resulting core-shell type highly liquid absorbent resin particles, and some form of relationship is observed between particle shape and the liquid absorbency of the highly liquid absorbent resin particles. Furthermore, the aforementioned HLB is routinely used as an indicator that expresses the hydrophilicity and lipophilicity of surfactants (JIS K3211).

The use of a nonionic surfactant having an HLB within the range of about 4 to 13 for the aforementioned nonionic surfactant (b) allows the obtaining of highly liquid absorbent resin particles having remarkably irregular particle surfaces, and these highly liquid absorbent resin particles have been demonstrated to have particularly superior liquid absorbency. Moreover, the use of the nonionic surfactants having a specific structure and a specific HLB shown in (1) through (3) below is preferable since it results in effects that improve liquid absorbency being demonstrated more remarkably:

(1) polyoxyalkylene sorbitan fatty acid esters having an HLB of 9 to 11;
(2) polyoxyalkylene glycerin fatty acid esters having an HLB of 9 to 10; and
(3) phosphate triesters having an HLB of 7 to 13.

The aforementioned nonionic surfactant (b) is preferably used within the range of 0.01 to 5% by mass relative to the aforementioned hydrophobic organic solvent (a). If the amount of nonionic surfactant (b) used is within this range, the particle core portion composed of an acrylic polymer obtained in the first step can be adequately dispersed in hydrophobic organic solvent (a).

Although the acrylic polymer that forms core-shell type highly liquid absorbent resin particles produced according to the present invention is a polymer of a radical polymerizable compound having (meth)acrylic acid as a main component, other vinyl monomers copolymerizable therewith can also be used in addition to this (meth)acrylic acid.

Examples of other vinyl monomers that can be used within a range that does not impair the effects obtained by the present invention include acrylamide-2-methylpropane sulfonate, allylsulfonate, vinylsulfonate, 4-sulfobutylmethacrylate, (meth)acrylamide, N,N-dimethylacrylamide, N-methylol (meth)acrylamide and 2-hydroxyethyl(meth)acrylamide. Among them, (meth)acrylamide is preferable.

The aforementioned other vinyl monomer can be used within a range of 0 to 100 parts by mass relative to 100 parts by mass of the aforementioned (meth)acrylic acid. However, in order to obtain highly liquid absorbent resin particles having superior blood absorbency and which are resistant to decreases in blood absorbency even when made to repeatedly absorb blood, the other vinyl monomer is preferably used within the range of 0 to 5 parts by mass, and the use of (meth)acrylic acid alone is more preferably used.

Carboxyl groups of the aforementioned (meth)acrylic acid are preferably neutralized with a basic compound, and in the case the aforementioned other vinyl monomer has carboxyl groups or sulfonyl groups, these are also preferably neutralized with a basic compound. Preferably 20 to 100% by mol, and more preferably 30 to 60% by mol, of the carboxyl groups and sulfonyl groups are neutralized. Neutralization of the carboxyl groups and sulfonyl groups within the aforementioned ranges makes it possible to improve the liquid absorbency of the resulting highly liquid absorbent resin particles.

Examples of the aforementioned basic compound that can be used include sodium hydroxide, potassium hydroxide, lithium hydroxide and rubidium hydroxide. Among them, sodium hydroxide and potassium hydroxide are preferable.

Next, an explanation is provided of crosslinking agent (c) used in the present invention.

Examples of crosslinking agent (c) that can be used in the present invention include a monomer having two or more radical polymerizable unsaturated double bonds (cI) or a compound having two or more functional groups that react with carboxyl groups. The use of monomer (cI) or compound (cII) makes it possible to obtain highly liquid absorbent resin particles having superior liquid absorbency, and particularly superior blood absorbency.

Examples of monomer (cI) having two or more radical polymerizable unsaturated double bonds include (meth) acrylic acid esters, tri(meth)acrylic acid esters, bis-acrylamides and polyvalent allyl compounds.

Examples of the aforementioned (meth)acrylic acid esters that can be used include ethylene glycol di(meth)acrylate, propylene glycol di(meth)acrylate, polyethylene glycol di(meth)acrylate, polypropylene glycol di(meth)acrylate and carbamyl di(meth)acrylate.

Examples of the aforementioned tri(meth)acrylic acid esters that can be used include trimethylol propane tri(meth) acrylate and pentaerythritol tri(meth)acrylate.

Examples of the aforementioned bis-acrylamides that can be used include N,N'-methylene bis-acrylamide and N,N'-ethylene bis-acrylamide.

Examples of the aforementioned polyvalent allyl compounds that can be used include diallyl phthalate, tetrallyloxy ethane, pentaerythritol triallyl ether, trimethylol propane triallyl ether, diethylene glycol diallyl ether and triallyl trimellitate.

Among the aforementioned examples of monomer (cI), ethylene glycol di(meth)acrylate, propylene glycol di(meth)acrylate, polypropylene glycol di(meth)acrylate and N,N'-methylene bis(meth)acrylamide are used preferably, and the use of these monomers makes it possible to obtain highly liquid absorbent resin particles having superior liquid absorbency, and particularly superior blood absorbency.

Examples of compounds that can be used for compound (cII) having two or more functional groups that react with carboxyl groups include compounds having two or more epoxy groups and compounds having two or more isocyanate groups.

Examples of the aforementioned compounds having two or more epoxy groups include ethylene glycol diglycidyl ether, polyethylene glycol diglycidyl ether, propylene glycol diglycidyl ether, polypropylene glycol diglycidyl ether, glycerin diglycidyl ether and polyglycerin diglycidyl ether. Among them, ethylene glycol diglycidyl ether is preferable.

Examples of the aforementioned compounds having two or more isocyanate groups include various types of polyisocyanates having moisture dispersivity.

The aforementioned crosslinking agent (c) is preferably used within the range of 0.01 to 1 part by mass relative to 100 parts by mass of the aforementioned (meth)acrylic acid. If the amount of crosslinking agent (c) used is less than 0.01 parts by mass, internal crosslinking of the resulting core-shell type highly liquid absorbent resin particles becomes inadequate, and liquid absorbency in the case of repeatedly absorbing a liquid as well as retention stability of absorbed liquid decrease. In addition, if the amount of crosslinking agent (c) exceeds 1 part by mass, excessive aggregation of the resulting highly liquid absorbent resin particles occurs, which is undesirable since this may cause a decrease in liquid absorbency. Thus, the amount of crosslinking agent (c) used is preferably within the range of 0.01 to 0.5 parts by mass with respect to 100 parts by mass of the aforementioned (meth)acrylic acid.

Next, an explanation is provided of the anionic surfactant (d) used in the present invention.

Examples of anionic surfactant (d) that can be used include N-acylamino acid salts, polyoxyethylene alkyl ether carboxylates, acylated peptides, alkyl sulfonates, alkyl benzene sulfonates, alkyl naphthalene sulfonates, naphthalene sulfonate-formalin polycondensation products, sulfosuccinates, α-olefin sulfonates, N-acylsulfonates, poloxyethylene alkyl ether sulfonates, alkylamide sulfates, alkylphosphates, polyoxyethylene alkyl ether phosphate esters, polyoxyethylene alkyl allyl ether phosphate esters and sulfonated oils.

Among the aforementioned anionic surfactants (d), a sulfonate represented by the following general formula (I) is used preferably. As a result of using a sulfonate represented by general formula (I), adhesion of the acrylic polymer particles obtained in the aforementioned first step to the walls of the reaction vessel and stirrer can be inhibited.

$$R'-SO_3M \qquad (I)$$

In general formula (I), R' represents an alkenyl group having 8 to 30 carbon atoms or a hydroxyalkyl group having 8 to 24 carbon atoms, and M represents an alkaline metal, quaternary ammonium or quaternary amine.

Examples of alkenyl groups having 8 to 30 carbon atoms include a hexadecenyl group, tetradecenyl group, dodecenyl group, octadecenyl group, decenyl group and octenyl group.

Examples of sulfonates having an alkenyl group having 8 to 30 carbon atoms that can be used include sodium octadecene sulfonate, sodium hexadecene sulfonate, sodium tetradecene sulfonate, sodium dodecene sulfonate, sodium decene sulfonate and sodium octane sulfonate.

Examples of hydroxyalkyl groups having 8 to 24 carbon atoms include a hydroxylauryl group, hydroxyoctyl group, hydroxyhexadecyl group, hydroxytetradecyl group, hydroxyoctadecyl group and hydroxydecyl group.

Examples of sulfonates having a hydroxyalkyl group having 8 to 24 carbon atoms that can be used include sodium hydroxylauryl sulfonate, sodium hydroxyoctyl sulfonate, sodium hydroxyhexadecyl sulfonate, sodium hydroxytetradecyl sulfonate, sodium hydroxyoctadecyl sulfonate and sodium hydroxydecyl sulfonate.

In addition, an α-olefin sulfonate in the form of a mixture of a sulfonate having an alkenyl group having 8 to 30 carbon atoms and a sulfonate having a hydroxyalkyl group having 8 to 24 carbon atoms can be used for the aforementioned anionic surfactant (d).

Anionic surfactant (d) is preferably used within the range of 1 to 10 parts by mass with respect to 100 parts by mass of the aforementioned (meth)acrylic acid. If the amount of anionic surfactant (d) used is within this range, the degree of aggregation of the aforementioned acrylic polymer particles can be controlled to a suitable state, and core-shell type highly liquid absorbent resin particles can be obtained that have remarkably irregular particles surfaces and demonstrate superior liquid absorbency.

Next, an explanation is provided of a radical polymerization initiator used in the present invention.

In the present invention, a radical polymerization initiator can be used to initiate a radical polymerization reaction of the (meth)acrylic acid and crosslinking agent (c) contained in the aforementioned aqueous solution (e). Examples of this radical polymerization initiator include peroxides such as hydrogen peroxide, potassium persulfate, sodium persulfate and ammonium persulfate, and azo compounds such as 2,2'-azobis-(2-aminodipropane)dihydrochloride, 2,2'-azobis-(N,N'-dimethyleneisobutylamidine)dihydrochloride and 2,2'-azobis-(2-methyl-N-[1,1-bis(hydroxymethyl)-2-hydroxyethyl] propionamide). These can be used alone or in a combination of two or more types. The aforementioned peroxides can also be used in combination with amine salts and reducing substances such as sulfites and L-ascorbic acid, and can also be used as initiators of redox systems.

The aforementioned radical polymerization initiator is preferably used within the range of 0.1 to 1 part by mass with respect to 100 parts by mass of the aforementioned (meth) acrylic acid. If the amount of radical polymerization initiator used is within this range, the molecular weight of the resulting acrylic polymer particles can be adjusted to a range that is preferable in terms of producing core-shell type highly liquid absorbent resin particles having superior liquid absorbency.

The aforementioned (meth)acrylic acid, crosslinking agent (c) and anionic surfactant (d) are gradually supplied to the aforementioned hydrophobic organic solvent (a) in the form of aqueous solution (e). Aqueous solution (e) can be produced by mixing the (meth)acrylic acid, crosslinking agent (c), anionic surfactant (d), and, as necessary, other vinyl monomers and radical polymerization initiators, with water followed by stirring.

Next, an explanation is provided of aqueous solution (g) of water-soluble vinyl polymer (f) used in the present invention that has carboxyl groups and polymerizable unsaturated double bonds, and a number average molecular weight of 500 to 10000.

The carboxyl groups contained by water-soluble vinyl polymer (f) may be neutralized with a basic compound. A basic compound similar to that indicated as being able to be used during neutralization of the carboxyl group of (meth)

acrylic acid contained in the aforementioned aqueous solution (g) can also be used for this basic compound.

In addition, water-soluble vinyl polymer (f) preferably has an acid value within the range of 130 to 800, and more preferably has an acid value within the range of 300 to 500. As a result of using a water-soluble vinyl polymer (f) having an acid value within these ranges, the blood absorbency and blood retention stability of the resulting core-shell type highly liquid absorbent resin particles can be improved, and decreases in blood absorbency in the case of repeatedly absorbing blood can be inhibited.

Preferably 1 to 3 of the polymerizable unsaturated double bonds contained by water-soluble vinyl polymer (f) are present in water-soluble vinyl polymer (f). As a result of using a water-soluble vinyl polymer (f) having a number of polymerizable unsaturated double bonds within this range, excessive aggregation of the resulting core-shell type highly liquid absorbent resin particles can be inhibited, and decreases in liquid absorbency can be prevented.

The number average molecular weight of water-soluble vinyl polymer (f) has an effect on changes in blood absorbency in the case of having the resulting highly liquid absorbent resin particles repeatedly absorb blood. Since superior blood absorbency can be maintained even when blood is repeatedly absorbed, the number average molecular weight of water-soluble vinyl polymer (f) is preferably within the range of 500 to 10000, more preferably within the range of 1000 to 5000, and even more preferably within the range of 2000 to 4000.

Water-soluble vinyl polymer (f) can be produced by, for example, reacting a vinyl polymer having carboxyl groups with a compound having an epoxy group and polymerizable unsaturated double bonds in water.

The vinyl polymer having carboxyl groups may be a vinyl homopolymer obtained by polymerizing one type of vinyl monomer, or it may be a block copolymer or random copolymer obtained by polymerizing two or more types of vinyl monomers.

The aforementioned vinyl polymer having carboxyl groups can be produced by, for example, by radical polymerizing a vinyl monomer having carboxyl groups and, as necessary, other vinyl monomers, in the presence of a radical polymerization initiator and water.

Examples of vinyl monomers having carboxyl groups that can be used include (meth)acrylic acid, maleic acid and fumaric acid. Among them, (meth)acrylic acid is used preferably.

Examples of other vinyl monomers that can be used include vinyl monomers having an amide group or hydroxyl group such as (meth)acrylamide, 2-hydroxyethyl(meth)acrylate, 2-hydroxy-propyl(meth)acrylate and 2-hydroxybutyl(meth)acrylate. Even if a vinyl monomer having an amide group or hydroxyl group is used in combination with the aforementioned (meth)acrylic acid, it is unlikely to cause a decrease in the blood absorbency of the resulting core-shell type highly liquid absorbent resin particles.

The use of polyacrylic acid obtained by polymerizing acrylic acid is preferable for the vinyl polymer having carboxyl groups in terms of producing highly liquid absorbent resin particles having superior liquid absorbency.

A radical polymerization initiator similar to that indicated as being able to be used as necessary in the aforementioned first step can also be used for the aforementioned radical polymerization initiator.

Examples of the compound having an epoxy group and polymerizable unsaturated double bonds that reacts with the vinyl polymer having carboxyl groups that can be used include allyl glycidyl ether and glycidyl(meth)acrylate. In particular, the use of glycidyl methacrylate is preferable since side reactions in water of the vinyl polymer having carboxyl groups can be inhibited.

The amount of water-soluble vinyl polymer (f) used in the production method of the present invention is preferably within the range of 3 to 10 parts by mass with respect to 100 parts by mass of the aforementioned (meth)acrylic acid. That is, aqueous solution (g) should be used in the aforementioned second step that contains the aforementioned amount of water-soluble vinyl polymer (f). If the amount of water-soluble vinyl polymer (f) used is within the aforementioned range, the resulting core-shell type highly liquid absorbent resin particles can be made to have superior liquid absorbency, and particularly superior repeated blood absorbency.

In the aforementioned second step of the production method of highly liquid absorbent resin particles of the present invention, in addition to aqueous solution (g) of water-soluble vinyl polymer (f), an aqueous solution of a compound having polymerizable unsaturated double bonds and carboxyl groups, which is obtained by reacting a high molecular weight compound having a hydroxyl group and a carboxyl group such as alginic acid and hyaluronic acid with a compound having the aforementioned epoxy groups and polymerizable unsaturated double bonds, can be used within a range that does not impair an object of the present invention.

EXAMPLES

The following are examples of the present invention.

Furthermore, evaluation of blood absorbency and repeated blood absorbency shown in Table 1 and measurement of average particle diameter and number average molecular weight were carried out using the methods indicated below.

Evaluation of Blood Absorbency 20 g of defibrinated equine blood (Japan Biological Material Center Corporation) were added to 1 g of highly liquid absorbent resin particles in a Schale having an inner diameter of 95 mm and the blood was allowed to be absorbed for 1 minute. One minute later, the highly liquid absorbent resin particles that had absorbed blood were then placed on five layered sheets of filter paper having a diameter of 20 cm to remove any surplus blood that had not been absorbed. The amount of blood absorbed (g) per 1 g of highly liquid absorbent resin particles was then determined by subtracting the mass of the highly liquid absorbent resin particles before absorbing blood from the mass of the highly liquid absorbent resin particles after having absorbed blood.

Evaluation of Repeated Blood Absorbency 2.5 g of defibrinated equine blood were added to 0.5 g of highly liquid absorbent resin particles in a Schale having an inner diameter of 95 mm followed by measuring the amount of time until the defibrinated equine blood was completely absorbed. An additional 2.5 g of defibrinated equine blood were added after 2 minutes had elapsed since the defibrinated equine blood was initially added, and the amount of time until the defibrinated equine blood was completely absorbed was measured.

Measurement of Average Particle Diameter

A 16 mesh sieve, 30 mesh sieve, 100 mesh sieve, 140 mesh sieve and 235 mesh sieve, all of which satisfied the standards described in JIS Z8801-1, along with a receiving dish were combined in that order starting from the top, and 20 g of highly liquid absorbent resin particles were placed on the uppermost 16 mesh sieve followed by shaking well. After shaking, the mass ratios (sieve residues) of the highly liquid absorbent resin particles that remained on each sieve to the total amount of highly liquid absorbent resin particles were determined. Particle size distributions were prepared from the values obtained by integrating each sieve residue starting from the sieve with the largest mesh size and the corresponding sieve mesh sizes. The mesh size of the sieve where the value obtained by integrating each sieve residue reached 50% by mass of the particle size distribution was defined as the average particle diameter.

Number Average Molecular Weight

The number average molecular weight was measured using a liquid chromatograph equipped with a coupled column consisting of a first column (TSKGEL G5000 PWXL, Tosoh Corporation) and a second column (TSKGEL G3000 PWXL, Tosoh Corporation), a detector (RI-8000, Tosoh Corporation) and a pump (CCPM, Tosoh Corporation) and 0.1 M phosphate buffer (pH 7.0) for the medium.

Reference Example 1

187.7 parts by mass of ion exchange water were charged into a reaction vessel provided with a stirrer, dropping apparatus, refluxing apparatus and nitrogen gas feed tube followed by heating to 93° C. in the presence of a nitrogen atmosphere. Next, 124.3 parts by mass of acrylic acid and an aqueous solution containing 9.8 parts by mass of sodium persulfate and 61.29 parts by mass of ion exchange water were dropped in at the same temperature over 2 hours.

Following completion of dropping, the reactants were allowed to react for 6 hours at the same temperature, and then the temperature was lowered to 25° C. Next, a 30% by mass aqueous solution of sodium hydroxide was added to prepare an acrylic resin aqueous solution having a non-volatile content of 35% by mass, Gardner viscosity of C-D, and pH of 2.61.

100 parts by mass of the aforementioned acrylic resin aqueous solution were charged into a different reaction vessel provided with a stirrer, dropping apparatus, refluxing apparatus and air feed tube followed by heating to 70° C. in the presence of an air atmosphere. Next, 2.4 parts by mass of glycidyl methacrylate were added, and after allowing to react for 1 hour at the same temperature, 24.4 parts by mass of a 30% by mass aqueous solution of sodium hydroxide were added to prepare an aqueous solution (g1) of a water-soluble vinyl polymer (f1) having carboxyl groups and radical polymerizable unsaturated double bonds and having a pH of 5.07, number average molecular weight of 3000, and non-volatile content of 33.4% by mass.

Reference Example 2

187.7 parts by mass of ion exchange water were charged into a reaction vessel provided with a stirrer, dropping apparatus, refluxing apparatus and nitrogen gas feed tube followed by heating to 93° C. in the presence of a nitrogen atmosphere. Next, 124.3 parts by mass of acrylic acid and an aqueous solution containing 3.7 parts by mass of sodium persulfate and 61.29 parts by mass of ion exchange water were dropped in at the same temperature over the course of 2 hours.

Following completion of dropping, the reactants were allowed to react for 6 hours at the same temperature, and then the temperature was lowered to 25° C. Next, a 30% by mass aqueous solution of sodium hydroxide was added to prepare an acrylic resin aqueous solution having a non-volatile content of 35% by mass, Gardner viscosity of H-I, and pH of 2.57.

100 parts by mass of the aforementioned acrylic resin aqueous solution were charged into a different reaction vessel provided with a stirrer, dropping apparatus, refluxing apparatus and air feed tube followed by heating to 70° C. in the presence of an air atmosphere. Next, 0.9 parts by mass of glycidyl methacrylate were added, and after allowing to react for 1 hour at the same temperature, 24.4 parts by mass of a 30% by mass aqueous solution of sodium hydroxide were added to prepare an aqueous solution (g2) of a water-soluble vinyl polymer (f2) having carboxyl groups and radical polymerizable unsaturated double bonds and having a pH of 5.02, number average molecular weight of 8000, and non-volatile content of 34.5% by mass.

Reference Example 3

187.7 parts by mass of ion exchange water were charged into a reaction vessel provided with a stirrer, dropping apparatus, refluxing apparatus and nitrogen gas feed tube followed by heating to 93° C. in the presence of a nitrogen atmosphere. Next, a mixture of 121.2 parts by mass of acrylic acid and 6.4 parts by mass of acrylamide and a solution containing 9.8 parts by mass of sodium persulfate and 61.29 parts by mass of ion exchange water were dropped in over the course of 2 hours.

Following completion of dropping, the reactants were allowed to react for 6 hours at the same temperature, and then the temperature was lowered to 25° C. Next, a 30% by mass aqueous solution of sodium hydroxide was added to prepare an acrylic resin aqueous solution having a non-volatile content of 35% by mass, Gardner viscosity of C-D, and pH of 2.45.

100 parts by mass of the aforementioned acrylic resin aqueous solution were charged into a different reaction vessel provided with a stirrer, dropping apparatus, refluxing apparatus and air feed tube followed by heating to 70° C. in the presence of an air atmosphere. Next, 2.4 parts by mass of glycidyl methacrylate were added, and after allowing to react for 1 hour at the same temperature, 24.4 parts by mass of a 30% by mass aqueous solution of sodium hydroxide were added to prepare an aqueous solution (g3) of a water-soluble vinyl polymer (f3) having carboxyl groups and radical polymerizable unsaturated double bonds and having a pH of 5.33, number average molecular weight of 3000, and non-volatile content of 35.3% by mass.

Reference Example 4

319.9 parts by mass of ion exchange water were charged into a reaction vessel provided with a stirrer, dropping apparatus, refluxing apparatus and nitrogen gas feed tube followed by heating to 93° C. in the presence of a nitrogen atmosphere. Next, a mixture of 65.1 parts by mass of acrylic acid and 195.2 parts by mass of 2-hydroxyethyl acrylate, and a solution containing 20.2 parts by mass of sodium persulfate and 105 parts by mass of ion exchange water were dropped in over the course of 2 hours.

Following completion of dropping, the reactants were allowed to react for 6 hours at the same temperature, and then the temperature was lowered to 25° C. Next, a 30% by mass aqueous solution of sodium hydroxide was added to prepare an acrylic resin aqueous solution having a non-volatile content of 35% by mass, Gardner viscosity of H, and pH of 2.61.

80 parts by mass of the aforementioned acrylic resin aqueous solution were charged into a different reaction vessel provided with a stirrer, dropping apparatus, refluxing apparatus and air fed tube followed by heating to 70° C. in the presence of an air atmosphere. Next, 2.0 parts by mass of glycidyl methacrylate were added, and after allowing to react for 1 hour at the same temperature, 5.2 parts by mass of a 30% by mass aqueous solution of sodium hydroxide were added to prepare an aqueous solution (g4) of a water-soluble vinyl polymer (f4) having carboxyl groups and radical polymerizable unsaturated double bonds and having a pH of 5.22, number average molecular weight of 4000, and non-volatile content of 36.2% by mass.

Reference Example 5

187.7 parts by mass of ion exchange water were charged into a reaction vessel provided with a stirrer, dropping apparatus, refluxing apparatus and nitrogen gas feed tube followed by heating to 93° C. in the presence of a nitrogen atmosphere. Next, 124.3 parts by mass of acrylic acid and a solution containing 1.5 parts by mass of sodium persulfate and 61.29 parts by mass of ion exchange water were dropped in over the course of 2 hours.

Following completion of dropping, the reactants were allowed to react for 6 hours at the same temperature, and then the temperature was lowered to 25° C. Next, a 30% by mass aqueous solution of sodium hydroxide was added to prepare an acrylic resin aqueous solution having a non-volatile content of 35% by mass, Gardner viscosity of L-M, and pH of 2.88.

100 parts by mass of the aforementioned acrylic resin aqueous solution were charged into a different reaction vessel provided with a stirrer, dropping apparatus, refluxing apparatus and air fed tube followed by heating to 70° C. in the presence of an air atmosphere. Next, 0.4 parts by mass of glycidyl methacrylate were added, and after allowing to react for 1 hour at the same temperature, 24.4 parts by mass of a 30% by mass aqueous solution of sodium hydroxide were added to prepare an aqueous solution (g5) of a water-soluble vinyl polymer (f5) having carboxyl groups and radical polymerizable unsaturated double bonds and having a pH of 5.15, number average molecular weight of 20000, and non-volatile content of 34.2% by mass.

Reference Example 6

96 parts by mass of maleic anhydride and 50 parts by mass of ion exchange water were added to a 1-liter four-neck flask provided with a stirring apparatus, thermometer, refluxing apparatus and nitrogen gas feed tube followed by heating to 55° C. to dissolve the maleic anhydride. Next, 60.8 parts by mass of 28% by mass aqueous ammonia were added to the slurry-like maleic anhydride which was obtained by cooling to 40° C., and then the mixture was allowed to react for 3 hours at 80° C. Following the reaction, 10 parts by mass of 85% by mass aqueous solution of phosphoric acid were added to 100 parts by mass of the residue obtained by distilling the ion exchange water within the four-neck flask. And then, the pressure was reduced, and the mixture was allowed to react for 4 hours in a 200° C. oil bath to prepare a powdery polysuccinoimide having a number average molecular weight of 3000.

75 parts by mass of an aqueous solution in which 20.6 parts by mass of sodium hydroxide were dissolved and 50 parts by mass of the aforementioned powdery polysuccinimide were mixed in a different reaction vessel provided with a stirring apparatus, thermometer, refluxing apparatus and nitrogen gas feed tube to obtain an aqueous solution of polysuccinoimide. Next, after heating to 90° C., 5.0 parts by mass of glycidyl methacrylate were added and reacted for 1 hour to prepare an aqueous solution of polyaspartic acid having methacryloyl groups and having a number average molecular weight of 3000 and non-volatile content of 58.2% by mass.

Reference Example 7

30 parts by mass of acrylic acid were added to a 500 ml externally cooled Erlenmeyer flask followed by dropping 81.5 parts by mass of an aqueous solution of lithium hydroxide, in which 8.74 parts by mass of lithium hydroxide monohydrate was dissolved, to neutralize 50 mol % of the carboxyl groups contained in the acrylic acid. Next, 1.89 parts by mass of Latemul PS (sodium alkane sulfonate, Kao Corporation), 0.0234 parts by mass of N,N'-methylene-bis-acrylamide and 0.05 parts by mass of ammonium persulfate were added to prepare an acrylic acid aqueous solution (e1).

Reference Example 8

30 parts by mass of acrylic acid were added to a 500 ml externally cooled Erlenmeyer flask followed by dropping in 81.5 parts by mass of an aqueous solution of lithium hydroxide, in which 8.74 parts by mass of lithium hydroxide monohydrate was dissolved, to neutralize 50 mol % of the acrylic acid. Next, 1.12 parts by mass of Praiserf A210G (phosphate based surfactant, polyoxyethylene octylphenyl ether phosphate, Daiichi Kogyo Seiyaku Co., Ltd.), 0.0234 parts by mass of N,N'-methylene-bis-acrylamide and 0.05 parts by mass of ammonium persulfate were added to prepare an acrylic acid aqueous solution (e2).

Example 1

164 parts by mass of cyclohexane and 0.82 parts by mass of Rheodol TW-O106V (polyoxyethylene sorbitol monooleate (6 mole addition product of ethylene oxide) (HLB=10.0), Kao Corporation) were added to a 500 ml four-neck flask provided with a stirring apparatus, thermometer, refluxing apparatus and nitrogen gas blowing apparatus, and dispersed while stirring at 500 rpm.

Figure 2:
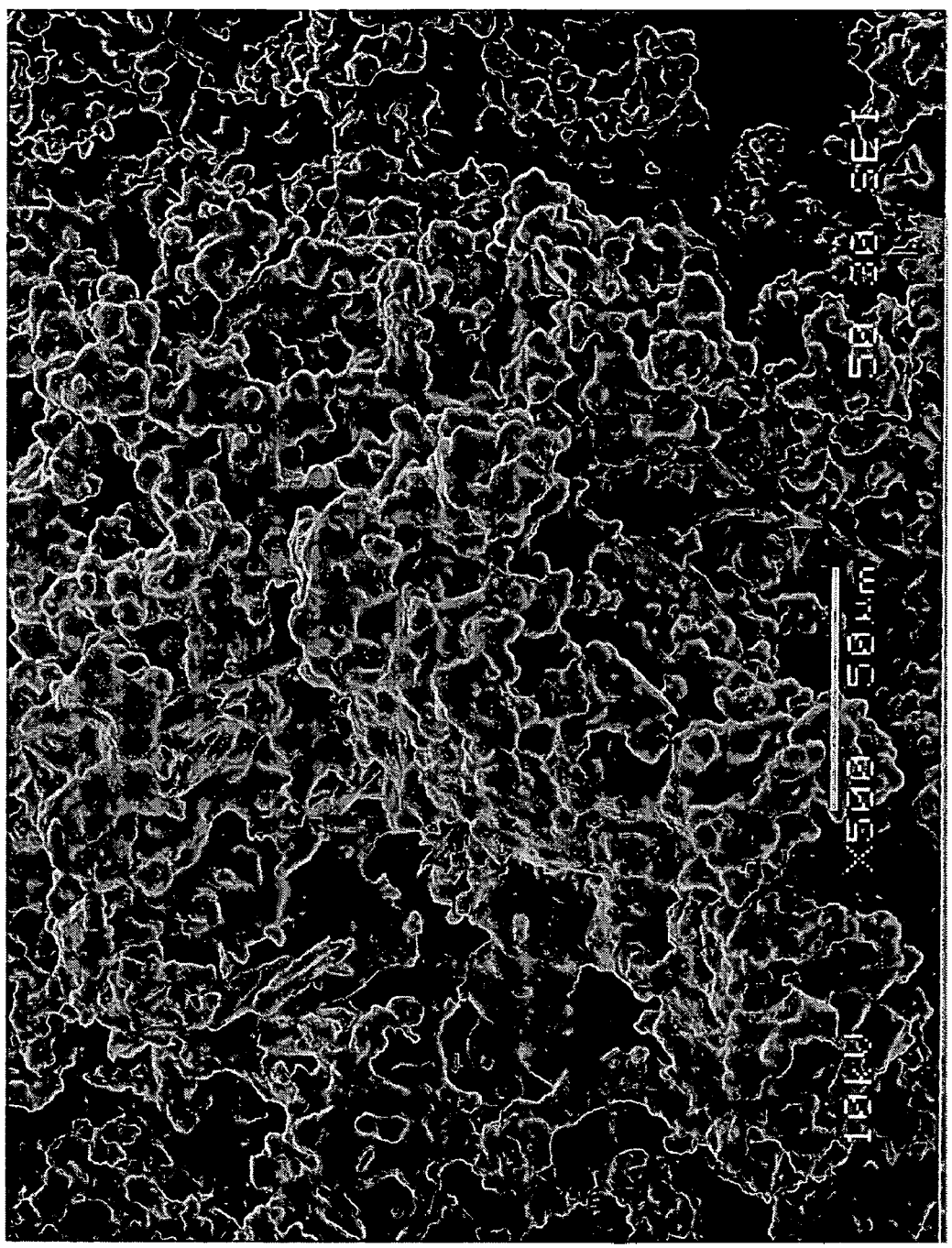
FIG. 2 is a photograph of highly liquid absorbent resin particles (A) obtained in Example 1 taken at a magnification factor of 500 using a scanning electron microscope.

Next, after replacing the atmosphere inside the four-neck flask with nitrogen, the mixture was heated to 75° C., and then the acrylic acid aqueous solution (e1) prepared in Reference Example 7 was dropped in over the course of 1 hour. Following dropping, the aforementioned aqueous solution (g1) of water-soluble vinyl polymer (f1) (containing 8 parts by mass of water-soluble vinyl polymer (f1)) was added all at once and allowed to react for 1 hour at 70 to 75° C. After reacting, 90% by mass of the water present in the four-neck flask was dehydrated by azeotropic dehydration. Next, the cyclohexane was separated by decantation and after pre-drying for 3 hours at 70° C., the product was additionally dried under reduced pressure for 1 hour at 180° C. to prepare core-shell type highly liquid absorbent resin particles (A). The resulting highly liquid absorbent resin particles (A) had prominent irregularities in their surfaces as shown in FIGS. 1 and 2.

Example 2

With the exception of adding all at once the aforementioned aqueous solution (g2) of water-soluble vinyl polymer (f2) (containing 8 parts by mass of water-soluble vinyl polymer (f2)) instead of aqueous solution (g1) of water-soluble vinyl polymer (f1), core-shell type highly liquid absorbent resin particles (B) were prepared using the same method as Example 1. The resulting highly liquid absorbent resin particles (B) had prominent irregularities in their surfaces.

Example 3

With the exception of adding all at once the aforementioned aqueous solution (g3) of water-soluble vinyl polymer (f3) (containing 8 parts by mass of water-soluble vinyl polymer (f3)) instead of aqueous solution (g1) of water-soluble vinyl polymer (f1), core-shell type highly liquid absorbent resin particles (C) were prepared using the same method as Example 1. The resulting highly liquid absorbent resin particles (C) had prominent irregularities in their surfaces.

Example 4

With the exception of adding all at once the aforementioned aqueous solution (g4) of water-soluble vinyl polymer (f4) (containing 8 parts by mass of water-soluble vinyl polymer (f4)) instead of aqueous solution (g1) of water-soluble vinyl polymer (f1), core-shell type highly liquid absorbent resin particles (D) were prepared using the same method as Example 1. The resulting highly liquid absorbent resin particles (D) had prominent irregularities in their surfaces.

Example 5

164 parts by mass of cyclohexane and 0.41 parts by mass of Adekanol NK-4 (polyoxyethylene glycerin ester, HLB=9.5, Asahi Denka Co., Ltd.) were added to a 500 ml four-neck flask provided with a stirring apparatus, thermometer, refluxing apparatus and nitrogen gas blowing apparatus, and dispersed while stirring at 500 rpm. Next, after replacing the atmosphere inside the four-neck flask with nitrogen, the mixture was heated to 75° C., and then the acrylic acid aqueous solution (e1) prepared in Reference Example 7 was dropped in over the course of 1 hour. Following dropping, the aforementioned aqueous solution (g1) of water-soluble vinyl polymer (f1) (containing 8 parts by mass of water-soluble vinyl polymer (f1)) was added all at once and allowed to react for 1 hour at 70 to 75° C. After reacting, 90% by mass of the water present in the four-neck flask was dehydrated by azeotropic dehydration. Next, the cyclohexane was separated by decantation and after pre-drying for 3 hours at 70° C., the product was additionally dried under reduced pressure for 1 hour at 180° C. to prepare core-shell type highly liquid absorbent resin particles (E). The resulting highly liquid absorbent resin particles (E) had prominent irregularities in their surfaces.

Example 6

With the exception of using 0.41 parts by mass of Nikkor TDF-8 (tripolyoxyethylene alkyl ether phosphate (HLB=11.5), Nikko Chemicals Co., Ltd) instead of the aforementioned Adekanol NK-4 (polyoxyethylene glycerin ester, HLB=9.5, Asahi Denka Co., Ltd), core-shell type highly liquid absorbent resin particles (F) were prepared using the same method as the aforementioned Example 5. The resulting highly liquid absorbent resin particles (F) had prominent irregularities in their surfaces.

Example 7

164 parts by mass of cyclohexane and 0.2 parts by mass of Rheodol SP-S10V (Kao Corporation, sorbitan stearate) were added to a 500 ml four-neck flask provided with a stirring apparatus, thermometer, refluxing apparatus and nitrogen gas blowing apparatus, and dispersed while stirring at 500 rpm. Next, after replacing the atmosphere inside the four-neck flask with nitrogen, the mixture was heated to 75° C., and then the acrylic acid aqueous solution (e2) prepared in Reference Example 8 was dropped in over the course of 1 hour. Following dropping, the aforementioned aqueous solution (g1) of water-soluble vinyl polymer (f1) (containing 8 parts by mass of water-soluble vinyl polymer (f1)) was added all at once and allowed to react for 1 hour at 70 to 75° C. After reacting, 90% by mass of the water present in the four-neck flask was dehydrated by azeotropic dehydration. Next, the cyclohexane was separated by decantation and after pre-drying for 3 hours at 70° C., the product was additionally dried under reduced pressure for 1 hour at 180° C. to prepare core-shell type highly liquid absorbent resin particles (G). The resulting highly liquid absorbent resin particles (G) had prominent irregularities in their surfaces.

Comparative Example 1

164 parts by mass of cyclohexane and 0.2 parts by mass of Rheodol SP-S10V were added to a 500 ml four-neck flask provided with a stirring apparatus, thermometer, refluxing apparatus and nitrogen gas blowing apparatus, and dispersed while stirring at 500 rpm. Next, after replacing the atmosphere inside the four-neck flask with nitrogen, the mixture was heated to 75° C., and then the acrylic acid aqueous solution (e2) prepared in Reference Example 8 was dropped in over the course of 1 hour.

After pre-drying for 3 hours at 70° C. to 75° C., the product was additionally dried under reduced pressure for 1 hour at 180° C. to prepare highly liquid absorbent resin particles (H).

Comparative Example 2

With the exception of adding all at once an aqueous solution of polyaspartic acid having methacryloyl groups obtained in Reference Example 6 (containing 8 parts by mass of polyaspartic acid having methacryloyl groups) instead of the aforementioned aqueous solution (g1) of water-soluble vinyl polymer (f1), highly liquid absorbent resin particles (I) were prepared using the same production method as Example 1.

Comparative Example 3

Highly liquid absorbent resin particles (J) were prepared using the same production method as Example 1 with the exception of adding all at once 8 parts by mass of acrylic acid instead of the aforementioned aqueous solution (g1) of water-soluble vinyl polymer (f1).

Comparative Example 4

164 parts by mass of cyclohexane and 0.82 parts by mass of Rheodol TW-O106V (polyoxyethylene sorbitol monooleate (6 mole addition product of ethylene oxide) (HLB=10.0), Kao Corporation) were added to a 500 ml four-neck flask provided with a stirring apparatus, thermometer, refluxing apparatus and nitrogen gas blowing apparatus, and dispersed while stirring at 500 rpm.

Next, after replacing the atmosphere inside the four-neck flask with nitrogen, the mixture was heated to 75° C., and then the acrylic acid aqueous solution (e1) prepared in Reference Example 7 was dropped in over the course of 1 hour. Following dropping, since the viscosity increased when the aforementioned aqueous solution (g5) of water-soluble vinyl polymer (f5) (containing 8 parts by mass of water-soluble vinyl polymer (f5)) was added all at once, the stirring speed was set to about 330 rpm. Next, after allowing to react for 1 hour at 70 to 75° C., 90% by mass of the water present in the four-neck flask was dehydrated by azeotropic dehydration. Next, the cyclohexane was separated by decantation and after pre-drying for 3 hours at 70° C., the product was additionally dried under reduced pressure for 1 hour at 180° C. to prepare highly liquid absorbent resin particles (K).

TABLE 1

| Table 1 | Radical polymerizable compound used in second step | | | Highly liquid absorbent resin particles | | | | Repeated blood absorbency | |
|---------|--------|----------------------|-----------------------------|--------|-------|--------------------------|-------------------------|------------------|------------------|
|         | Symbol | Number avg. mol. wt. | Vinyl monomer composing compound | Symbol | Color | Avg. particle diameter (μm) | Blood absorbency (g) | 1s time (sec) | 2nd time (sec) |
| Ex. 1   | f1     | 3000                 | AA                          | A      | White | 160                      | 17.0                    | 13               | 10               |
| Ex. 2   | f2     | 8000                 | AA                          | B      | White | 150                      | 17.1                    | 15               | 16               |
| Ex. 3   | f3     | 3000                 | AA/AM                       | C      | White | 180                      | 16.0                    | 16               | 12               |
| Ex. 4   | f4     | 4000                 | AA/HEA                      | D      | White | 170                      | 16.5                    | 14               | 10               |
| Ex. 5   | f1     | 3000                 | AA                          | E      | White | 250                      | 15.5                    | 12               | 15               |
| Ex. 6   | f1     | 3000                 | AA                          | F      | White | 350                      | 14.8                    | 18               | 20               |
| Ex. 7   | f1     | 3000                 | AA                          | G      | White | 220                      | 14.8                    | 18               | 51               |
| Comp. Ex. 1 | —  | —                    | —                           | H      | White | 210                      | 11.5                    | 40               | 120<             |
| Comp. Ex. 2 | Pasp | 3000              | —                           | I      | Brown | 200                      | 15.9                    | 12               | 20               |
| Comp. Ex. 3 | AA | 72                   | AA                          | J      | White | 180                      | 15.5                    | 24               | 120<             |
| Comp. Ex. 4 | f5 | 20000                | AA                          | K      | White | 2000                     | 8.5                     | 120<             | 120<             |

The abbreviations used in Table 1 are explained below.
AA: Acrylic acid
AM: Acrylamide
HEA: 2-hydroxyethylacrylate
Pasp: Polyaspartic acid having methacryloyl groups obtained in Reference Example 6
According to the above results, the superior effects of the present invention were clearly demonstrated.

INDUSTRIAL APPLICABILITY

The present invention can be applied to a production method of highly liquid absorbent resin particles that are useful in various fields including medicine and hygiene.

What is claimed is:

1. A production method of core-shell type highly liquid absorbent resin particles comprising:
    (1) a first step in which a particle core portion is formed by suspension polymerizing an aqueous solution (e) containing (meth)acrylic acid, a crosslinking agent (c) and an anionic surfactant (d), wherein the anionic surfactant (d) is in an amount of 1 to 10 parts by mass with respect to 100 parts by mass of the (meth)acrylic acid, in a hydrophobic organic solvent (a) containing a nonionic surfactant (b), the anionic surfactant (d) being represented by the following general formula (I):

R'—SO$_3$M     (I)

wherein, R' represents an alkenyl group having 8 to 30 carbon atoms or a hydroxyalkyl group having 8 to 24 carbon atoms, and M represents an alkaline metal, quaternary ammonium or quaternary amine, and
    (2) a second step in which a shell portion that covers the particle core portion is formed by suspension polymerizing an aqueous solution (g) containing a water-soluble vinyl polymer (f), having carboxyl groups and polymerizable unsaturated double bonds and having a number average molecular weight of 500 to 10000, in a suspension obtained in the first step.

2. The production method of core-shell type highly liquid absorbent resin particles according to claim 1, wherein the water-soluble vinyl polymer (f) is polyacrylic acid having polymerizable unsaturated double bonds.

3. The production method of core-shell type highly liquid absorbent resin particles according to claim 1, wherein the nonionic surfactant (b) has an HLB value of 4 to 13.

4. The production method of core-shell type highly liquid absorbent resin particles according to claim 1, wherein the nonionic surfactant (b) is at least one type selected from the group consisting of polyoxyalkylene sorbitan fatty acid ester having an HLB value of 9 to 11, polyoxyalkylene glycerin fatty acid ester having an HLB value of 9 to 10, and phosphate triester having an HLB value of 7 to 13.

5. The production method of core-shell type highly liquid absorbent resin particles according to claim 1, wherein the second step is a step in which the aqueous solution (g) containing a water-soluble vinyl polymer (f) is added into the suspension obtained in the first step to perform suspension polymerization.

6. The production method of core-shell type highly liquid absorbent resin particles according to claim 1, wherein the crosslinking agent (c) is a monomer having two or more radical polymerizable unsaturated double bonds (cI) or a compound having two or more functional groups that react with carboxyl groups.

7. The production method of core-shell type highly liquid absorbent resin particles according to claim 1, wherein a hydrophobic organic solvent included in the hydrophobic organic solvent (a) is at least one selected from the group consisting of n-pentane, n-hexane, n-heptane, n-octane, cyclohexane, methylcyclohexane, and benzene, toluene and xylene.

8. The production method of core-shell type highly liquid absorbent resin particles according to claim 1, wherein the nonionic surfactant is at least one selected from the group consisting of polyoxyalkylene sorbitan fatty acid esters, polyoxyalkylene sorbitol fatty acid esters, polyoxyalkylene glycerin fatty acid esters, sorbitan fatty acid esters, sucrose fatty acid esters, glycerin fatty acid esters, polyoxyalkylene alkyl ethers, phosphate triesters and block copolymers of polyoxyethylene and polyoxypropylene.

9. The production method of core-shell type highly liquid absorbent resin particles according to claim 1, wherein the crosslinking agent (c) is at least one selected from the group consisting of (meth)acrylic acid esters, tri(meth)acrylic acid esters, bis-acrylamides and polyvalent allyl compounds.

10. The production method of core-shell type highly liquid absorbent resin particles according to claim 1, wherein water-soluble vinyl polymer (f) has an acid value within the range of 130 to 800; 1 to 3 of the polymerizable unsaturated double bonds contained by water-soluble vinyl polymer (f) are present in water-soluble vinyl polymer (f); and the amount of water-soluble vinyl polymer (f) is within the range of 3 to 10 parts by mass with respect to 100 parts by mass of the aforementioned (meth)acrylic acid.

11. The production method of core-shell type highly liquid absorbent resin particles according to claim 1, further comprising a third step in which the combination of the particle core portion and the shell portion that covers the core portion is dried by removing water and hydrophobic organic solvent (a).

12. The production method of core-shell type highly liquid absorbent resin particles according to claim 11, wherein the combination of the particle core portion and the shell portion obtained after drying is a core-shell type highly liquid absorbent resin particle, which is white.

* * * * *